United States Patent [19]

Spainger

[11] Patent Number: 5,122,917
[45] Date of Patent: Jun. 16, 1992

[54] UNITARY READ-WRITE HEAD ARRAY FOR MAGNETIC MEDIA

[75] Inventor: Gilbert Spainger, Fremont, Calif.

[73] Assignee: Iomega Corporation, Roy, Utah

[21] Appl. No.: 531,832

[22] Filed: Jun. 1, 1990

[51] Int. Cl.⁵ .............................................. G11B 5/147
[52] U.S. Cl. .................................... 360/126; 360/121
[58] Field of Search ........................ 360/121, 119, 126; 346/74.5

[56] References Cited

U.S. PATENT DOCUMENTS

| | | |
|---|---|---|
| 4,414,554 | 11/1983 | Springer . |
| 4,494,125 | 1/1985 | Springer . |
| 4,503,439 | 3/1985 | Springer . |
| 4,503,440 | 3/1985 | Springer . |
| 4,544,421 | 10/1985 | Springer . |
| 4,758,916 | 7/1988 | Niwa et al. . |
| 4,774,616 | 9/1988 | Kumasaka et al. . |
| 4,866,555 | 9/1989 | Inagoya et al. . |
| 4,992,897 | 2/1991 | Deroux-Dauphin ............... 360/126 |

Primary Examiner—A. J. Heinz
Attorney, Agent, or Firm—Woodcock Washburn Kurtz Mackiewicz & Norris

[57] ABSTRACT

An electromagnetic head array is provided for storage and retrieval of magnetic images on magnetic media moving adjacent to the head array. The head array is formed within a unitary amorphous metallic substrate approximately 1.5-mils thick. The illustrative head array includes seven separate heads formed within an area not exceeding ¼-inch square. Two head groupings are described, the first being compatible with existing flexible disc recording formats and the second for use with a substantially higher density format. A schematic head array mounting and interconnection system is also disclosed.

13 Claims, 3 Drawing Sheets

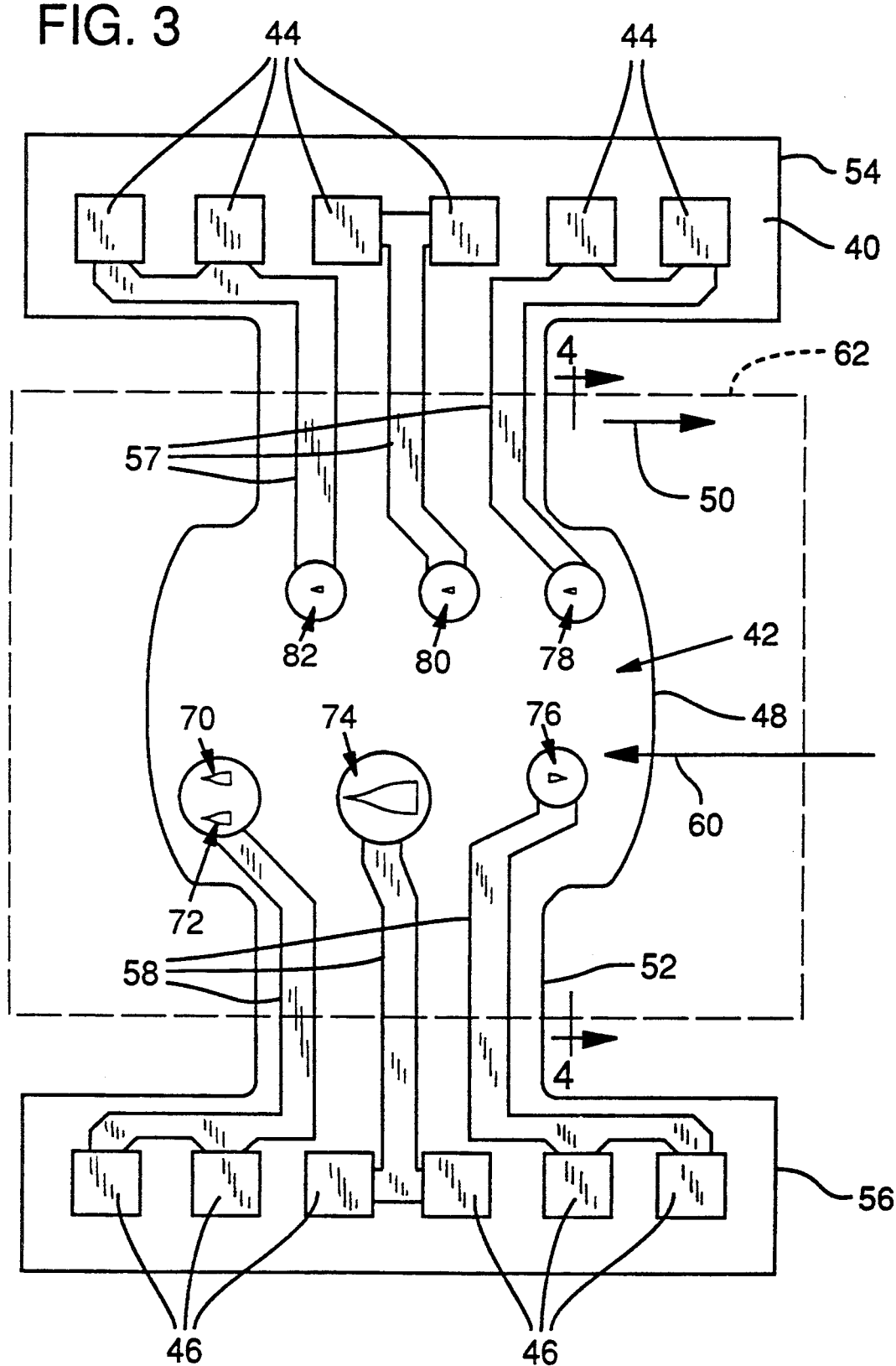

UNITARY READ-WRITE HEAD ARRAY FOR MAGNETIC MEDIA

BACKGROUND OF THE INVENTION

The present invention relates to electromagnetic recording and playback heads for use with magnetic media such as magnetic discs, tape and drums, and more particularly to a head array for high-density writing and reading on flexible magnetic media such as tape or floppy discs.

Prior to the development of my technique for forming electromagnetic heads within a thin web of metallic material, magnetic media read-write heads, particularly for high-performance data-tape applications, were generally fabricated as discrete structures. Head arrays, consisting of read, write and erase heads arranged in a selected format, have heretofore been assembled from a plurality of such separately-fabricated heads. The minimum spacing between heads has been a function of how small individual heads could practically be made and the minimum physical structure on which they could be mounted. Ideally, electromagnetic heads are made as small and closely spaced as possible to reduce weight and achieve high bit density. Industry standard formats for flexible magnetic media currently provide bit densities which enable a single 3½-inch flexible (i.e., floppy) disc to hold 1-to 2-megabytes of data and enable a reel of ¼-inch tape to hold 320-megabytes of data.

Smaller, more closely spaced heads could significantly increase the amount of data which a disc or tape can hold. Accordingly, there is a demand for electromagnetic read-write heads which are smaller in size, lower in mass, and which can be employed in smaller head arrays, thereby increasing the density of data stored on magnetic media.

Head structures fabricated in accordance with my invention, that is, heads formed within a thin web of high-permeability magnetic material, are described in the following two patent applications: Ser. No. 07/294,351, filed Jan. 9, 1989, entitled ELECTROMAGNETIC READ/WRITE HEAD, now U.S. Pat. No. 4,984,118, and Ser. No. 531,947, filed Jun. 1, 1991, entitled LINEAR-GAP, NON-GAP-ADJACENT-DISCONTINUITY, ELECTROMAGNETIC READ/WRITE HEAD WITH DIFFERENTIAL PERMEABILITY, filed contemporaneously with this application. In addition to the features claimed in those applications, I have found that my head structure is suitable for developing new, higher density magnetic data storage formats. Because the invention described in this application makes use of head structures and configurations disclosed in the above-identified patent applications, I incorporate the disclosures in those applications herein by reference.

SUMMARY OF THE INVENTION

It is an object of the present invention to provide an electromagnetic head array for storage and retrieval of magnetic encoded data which incorporates a plurality of head structures on a single, unitary web of thin magnetic material.

It is another object of the invention to provide an electromagnetic head array which enables very high bit densities to be laid down on magnetic media, substantially increasing the storage capacity of magnetic media.

It is another object of the invention to provide an electromagnetic head array which includes, on a thin unitary web of magnetic material, two head groupings, one compatible with current magnetic media data storage and retrieval formats and the other adapted to higher density formats.

Accordingly, an electromagnetic head array is provided for storage and retrieval of magnetic images on adjacent magnetic media moving relative to the head array. The head array comprises a unitary amorphous metallic substrate and plurality of head structures which are integral with the substrate. Each of the head structures includes a pair of juxtaposed magnetic pole components which define a gap for detecting and producing magnetic flux in the region adjacent the gap to respectively retrieve and induce magnetic images on media moving adjacent the gap. The head array also includes conductor means associated with each of the head structures for selective production and retrieval of electromagnetic signals from the heads in the array.

In its illustrative form, the electromagnetic head array of the present invention includes two head groupings. A first of the head groupings is configured to be compatible with present-day 3½-inch (and other size) flexible disc formats and the second grouping is for a proposed high-density format. The entire head array is fabricated within a unitary thin web of metallic material approximately 1.5-mils thick. A head gap architecture which facilitates the close spacing of recording tracks on the magnetic media is also disclosed.

BRIEF DESCRIPTION OF THE DRAWINGS

FIG. 3 is a plan view of an electromagnetic head array in accordance with the present invention formed on a unitary continuous web of thin magnetic material, together with pads for interconnection of the heads to external circuitry.

DETAILED DESCRIPTION OF THE PREFERRED EMBODIMENT

Figure 1:
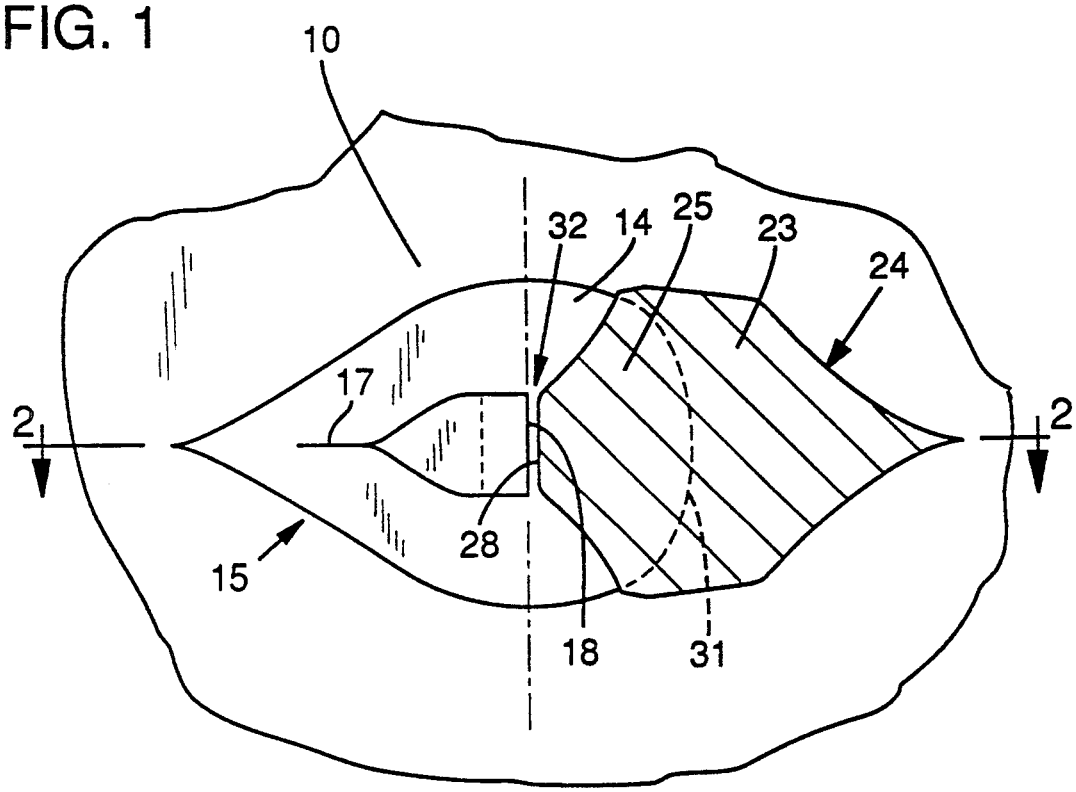
FIG. 1 is a partial, fragmentary plan view illustrating the structure of one of the magnetic heads in an array according to the present invention.
Figure 2:
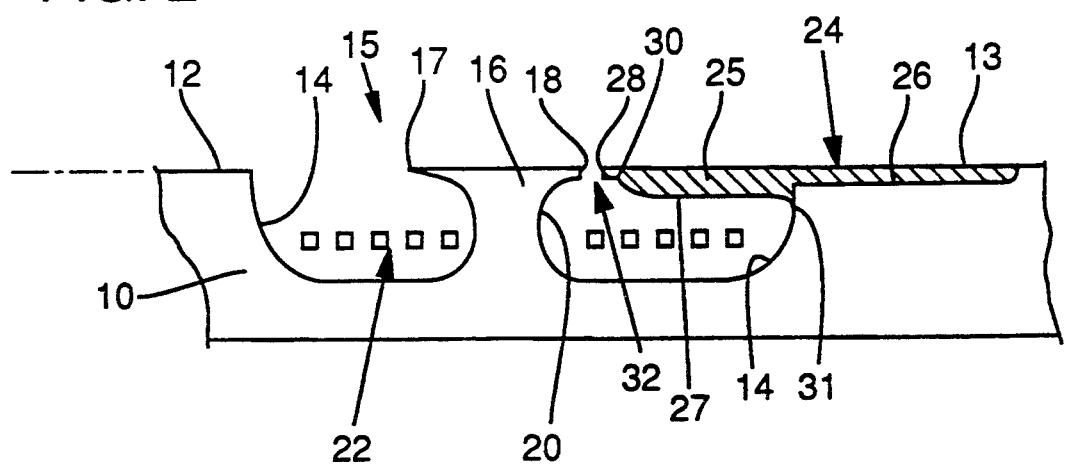
FIG. 2 is a partial, fragmentary, cross-sectional view of a head as in FIG. 1, taken generally along line 2—2 of FIG. 1.

The magnetic head array of the present invention includes a plurality of individual head structures, each of which includes the structural elements shown in FIGS. 1 and 2. As with any magnetic read-write-erase head, the fundamental structure is an electromagnet, consisting of a core of magnetic material, and an electrically conductive coil which induces electrical signals or in which such signals are induced. Each of the heads used in the array of the present invention includes all the basic elements of electromagnetic heads fabricated within a thin web of high permeability magnetic material, such as the heads described in the following patent applications: Ser. No. 07/294,351, filed Jan. 9, 1989, entitled ELECTROMAGNETIC READ/WRITE HEAD and Ser. No. 531,947, filed Jun. 1, 1990, entitled LINEAR-GAP NON-GAP-ADJACENT-DISCON- TINUITY ELECTROMAGNETIC READ/WRITE HEAD WITH DIFFERENTIAL PERMEABILITY, filed contemporaneously with this application. Since both those applications include information about the configuration of my head structures in connection with other inventions, information which might help further clarify the unique design they embody, I incorporate the disclosures therein by reference.

Referring to FIGS. 1 and 2, the web of high permeability magnetic material 10 in which the heads of the present invention are formed is a thin sheet of an amorphous metallic foil-like substance manufactured by Allied Chemical Company and sold under the registered trademark Metglas ®. Metglas has extremely high magnetic permeability, which makes it ideal for electromagnetic heads. I have found that Metglas having a nominal thickness of 1.5-mils is suitable for fabrication of the head arrays of the present invention. Two types of Metglas manufactured by Allied Chemical Company, sold under the designations 2826MB Metglas and 2605SE Metglas, have been found satisfactory for use with the present invention. Metglas web 10 is also referred to as a unitary amorphous metallic substrate on which the magnetic head array of the present invention is formed.

The head structure illustrated in FIGS. 1 and 2 is formed by a combination of chemical etching or other suitable removal techniques for creating patterns of voids in the upper surface 12 of Metglas substrate 10, and by the deposition of other suitable head-fabrication materials, described below, onto substrate 10. The method of fabrication forms no part of the present invention, but the resultant structure of each head in the head array includes the structural elements of the illustrative head shown in FIGS. 1 and 2.

Illustrative head 15 includes a cavity 14 extending from upper surface 12 of substrate 10 into the substrate. Cavity 14 extends around a central "island" 16 of Metglas which rises upwardly from a central portion of cavity 14. In plan view, cavity 14 is somewhat tear-drop shaped and island 16 is somewhat triangular (see FIG. 1). In a completed head, island 16 becomes one magnetic pole of the head structure, referred to below as the first magnetic pole component. Along one side of the top of "island" 16 in the Metglas substrate, opposite the curvilinear sides which sweep to a point 17, is an edge 18 which, in the completed head, defines one-half of a read-write head gap. The tear-drop shape of cavity 14 and the triangular shape of island 16 help minimize magnetic ghosting by eliminating edges in the head structure which extend parallel to first gap edge 18, as taught by my patent application Ser. No. 294,351, filed Jan. 9, 1989. First gap edge 18 is undercut beneath the upper surface 12 of first pole component 16 by an underbeveled surface 20, leaving a thickness or depth of Metglas at gap edge 18 of approximately one micron between the top and bottom of the gap edge.

Surrounding pole component 16, within cavity 14, is a coil of conductive material 22 which serves as conductor means associated with the head structure for selective production and retrieval of electromagnetic signals. FIG. 2 shows coil 22 as a plurality of rectangular elements suspended within cavity 14. It should be understood that what is being depicted is a coil in cross section (not shown in FIG. 1) extending around first pole component 16. Coil 22 is supported within cavity 14 by a bed of photoresist, polyamide or another suitable material (not shown) which is not electrically conductive and which substantially fills cavity 14 in a completed head. Coil 22 is interconnected with an electrical signal source, if the head structure is to be used as an electromagnetic write head, or with a suitable responsive device, if the head is to be used as a read head, or both, on a selective basis, if the head is to be used as a read-write head.

A second magnetic pole component 24 is formed of a different magnetic material, such as permalloy, on substrate 10, to provide the other half of the gap of the magnetic head structure. FIG. 1 shows second pole component 24 to be somewhat horn-like in shape, having an edge 28 at one end which serves as the second gap edge of the head structure. Second pole component 24 can alternatively assume other shapes, for example the onion-shape shown with dashed lines in FIGS. 5 and 6. Regardless of whether the permalloy second pole component 24 is shaped as shown in FIG. 1 or as shown in the other Figs., the shape of the outer perimeter of the head helps reduce ghosting by eliminating edges which extend parallel to gap edge 28 or parallel to the general orientation of the gap. Such a pole configuration is consistent with the anti-ghosting construction disclosed in application Ser. No. 07/294,351, filed Jan. 9, 1989. Second pole component 24 is inset into a cooperating indented shelf 26 formed in Metglas substrate 10 (see FIG. 2).

Second pole component 24 varies in thickness between the part overlying indented shelf 26 and the part overhanging cavity 14. The first part 25 of pole component 24 is inset into shelf 26 and forms approximately the right half of pole component 24, to the right of overlain edge 31 of cavity 14. That first part of pole 24 is approximately 3-microns thick, corresponding to the depth of shelf 26 below the upper surface 12 of substrate 10. The second part 25 of pole component 24, overhanging cavity 14 in the region extending from gap edge 28 to cavity edge 31, has a thickness of approximately 4-microns overall, but tapers to a thickness of approximately 1-micron at edge 28. The bottom of the second part 25 of pole component 24, i.e., the side 27 facing into cavity 14, tapers to a slightly greater thickness of approximately 5.5-microns along cavity edge 31, where it intersects and is joined to the wall of cavity 14. The greater thickness of the permalloy at the edge joint helps avoid magnetic saturation at that location. Second pole component 24 is bonded to Metglas substrate 10 within the indentation formed by shelf 26 using a suitable molecular bonding technique, such as sputtering or electroforming.

The above-described head structure thus includes a pair of juxtaposed first and second pole components 16 and 24, respectively, which define a gap 32 therebetween for detecting and producing lines of magnetic flux within, and immediately surrounding, gap 32. The magnetic field associated with the head can be visualized as imaginary lines of magnetic flux extending between pole components 16 and 24 which radiate outwardly from gap 32 on a "write" head to induce magnetic images on adjacent media moving past the gap. Similarly, magnetic images recorded on media moving past gap 32 on a head configured as a "read" head will induce such magnetic lines of flux in gap 32, where the magnetic images will be picked up by coil conductors 22 and transmitted to external monitoring devices. The preferred dimensions and shape of gap 32 for selected read, write and erase functions are described below.

The magnetic head array of the present invention uses a plurality of the above-described head structures integrated into a single, unitary Metglas substrate, as shown in FIG. 3. Substrate 40, which has an overall shape resembling a capital "I," includes a centrally disposed head array 42, which is shown in greater detail and on an enlarged scale in FIG. 5, and a plurality of connecting pads 44 and 46 on its upper surface at opposed ends of the substrate. Pads 44 and 46 are used to interconnect the individual heads in array 42 to external circuitry. Head array 42 is disposed centrally on substrate 40, at a slightly widened portion 48 of the central member of the "I" shaped substrate. The T-shaped extensions 54 and 56, on which pads 44 and 46 are respectively formed, join the central widened portion 48 at collinear central arms 50 and 52, respectively.

Connecting tracks 57 interconnect the three upper heads (as depicted in FIG. 3) to pads 44 and connecting tracks 58 connect the four lower heads to pads 46. Connecting tracks 57 and 58 are depicted schematically and include conductors necessary to effect connections between each head and an adjacent pair of pads. The exact configuration of the conductors included in tracks 57 and 58 is a matter of design choice, but will generally include a pair of conductors, each connecting a pad with a pole component on each respective head. The lower leftmost pair of heads, appearing together in a single circle in FIG. 3, are connected in parallel to a single pair of pads, consistent with the function of those heads, as described in detail below. The entire substrate 40 on which the heads, conducting tracks and pads are formed, is approximately 1.5-mils thick and is a single unitary piece of Metglas.

Figure 4:
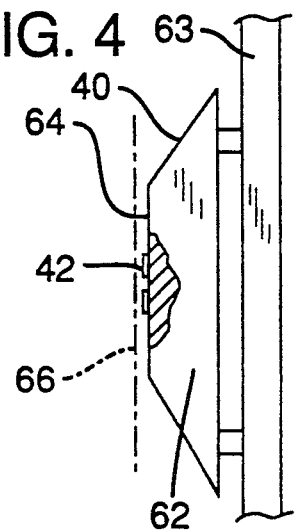
FIG. 4 is a cross-sectional view of the array shown in FIG. 3, taken along line 4—4 of FIG. 3, additionally showing the mounting support for the array of FIG. 3.

Referring to FIG. 4, substrate 40 is designed for installation on what I refer to as a "button" 62, which is in turn, mounted on a moveable supporting arm 63. Button 62 supports substrate 40 in a manner which, in some applications, may permit portions of arms 50 and 52 and T-shaped arm extensions 54 and 56 to be recessed away from the centrally-located head array 42. That allows the centrally-disposed head array 42 to protrude above the rest of substrate 40 in situations requiring intimate gap-media spacing, thereby permitting the head array to closely approach magnetic media which will pass by or contact the head array. The media will be moving in the direction of arrow 60 (FIG. 3), or into the page as viewed in FIG. 4. Obtaining the correct final shape for substrate 40, as mounted on a servo arm, is facilitated by the shape of mounting button 62, which has a generally flat surface 64 on the side over which substrate 40 is bent and formed. Attachment of the substrate to button 62 is effected by any suitable means, such as adhesive.

Mounting block or button 62 can be attached to a suitable supporting arm 63 or similar apparatus for incorporation into magnetic media read-write devices such as a disc drive or tape drive.

Figure 5:
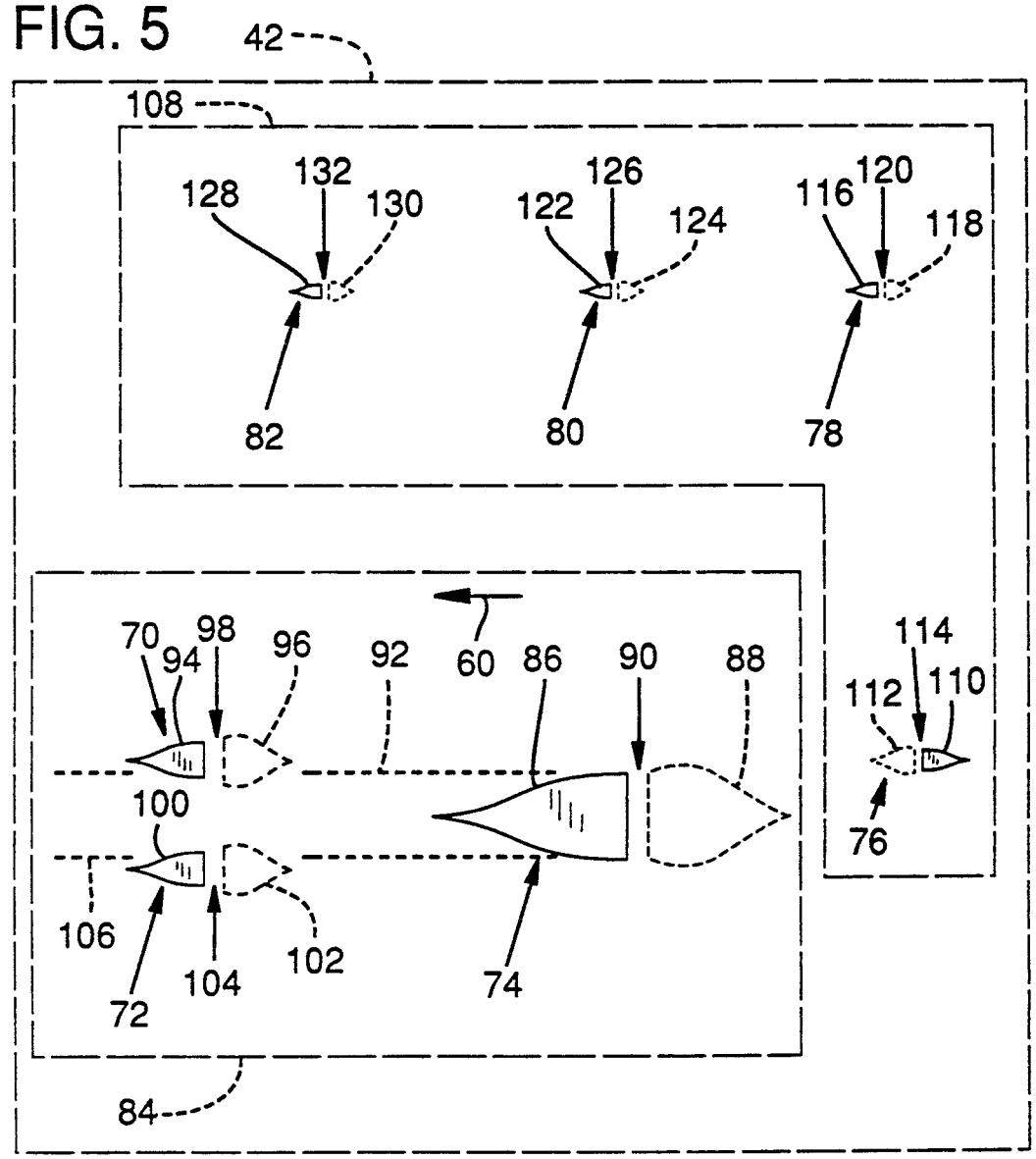
FIG. 5 is an enlarged view of the magnetic head array shown in FIG. 3.

FIG. 5 illustrates the head array 42 on an enlarged scale. In the embodiment shown, the magnetic read-write head array includes seven heads 70, 72, 74, 76, 78, 80 and 82 integral with substrate 40, which generally surrounds the head array as depicted in FIG. 5. Each of the seven heads in array 42 is illustrated partially schematically, but it should be understood that each contains the elements illustrated in FIGS. 1 and 2. Only a generally triangular portion is shown, on the left side of each head gap in heads 70, 72, 74, 78, 80 and 82, as viewed in FIG. 5, and on the right side of the gap in head 76, because that approximates the actual appearance of the heads when completed. Each of the triangles represents the "island" of Metglas 16 forming the first of the two juxtaposed magnetic pole components on each head (see FIGS. 1 and 2). In each schematic representation of heads 70, 72, 74, 76, 78, 80 and 82, the head gap is indicated generally by the flat side opposite the point where the two curvilinear sides of the triangle meet.

As viewed in FIG. 5, all seven head gaps are approximately parallel with one another and are perpendicular to the general direction of magnetic media motion, indicated by arrow 60. It should be understood, however, that a perpendicular gap orientation relative to the motion of the media is optional and, in certain applications, skewed gaps may be more desirable. Heads having gaps which are oriented at an angle to the direction of media flow can, for example, be used to lay down a "herringbone" type of recording pattern as a means of reducing interference from adjacent tracks. Skewed gaps may be formed with the pole components extending generally along the direction of media flow, as in the illustrated embodiment, and the gap edges angled relative to both the pole components and the direction of media flow. Alternatively, the entire head structure, including the pole components of each head, can be rotated to produce a skewed gap. Head arrays formed in accordance with the present invention can be produced in numerous alternative positions and orientations within the scope of the present invention.

As each head in array 42 is described in detail below, reference will be made to the first and second pole components, the head gap and other head elements previously named in connection with the description of the illustrative head shown in FIGS. 1 and 2. It should be understood that reference to like-named components refers to like structures in each head. For example, the first pole component of each head refers to the Metglas "island" 16 in FIGS. 1 and 2; the second pole component refers to permalloy insert 24 and the head gap refers to gap 32.

Head array 42 includes two groups of heads, a first grouping which is compatible with current formats for 3½-inch flexible discs and a second grouping which will provide for substantially higher bit densities through use of narrower tracks on the magnetic media. The invention is, of course, adaptable to other formats as well.

The first grouping of head structures in array 42 is made up of heads 70, 72 and 74, as indicated in FIG. 5 by reference number 84. This grouping includes a read-write head 74 and two erase heads 70 and 72. As shown in FIG. 5, read-write head 74 includes a first pole component 86, a second pole component 88 and gap 90 therebetween. The first head grouping 84 is designed to be compatible with current 3½-inch flexible disc formats which write on the disc within a specified "track" and employ a pair of "trim" erase heads to narrow the track and form narrow erase "guard bands" between adjacent tracks formed on the media. Erase head 70 includes a first pole component 94, a second pole component 96 and gap 98 therebetween. Erase head 72 includes first head component 100, second head component 102 and gap 104 therebetween. The "trim" erase heads 70, 72 are connected and operated in parallel with one another.

Arrow 60 depicts the direction of travel of the magnetic media relative to the head array. In the configuration shown, head 74, when writing on the media, lays down a pattern of magnetic images along the media with an overall width approximately equal to the width of gap 90. Gap width on a head is the dimension along the gap and gap length is the dimension across the gap. For head 74, the gap width is approximately 164-microns. Dashed lines 92 provide an approximate indication of the width of the magnetic images laid down on the magnetic media by head 74. "Trim" erase heads 70 and 72 narrow the track laid down by head 74 from track 92 to a final width depicted at 106.

First head grouping 84 is included in array 42 primarily for the purposes of compatibility with existing formats. The present invention, which includes the ability to lay down a plurality of head structures in close proximity to one another on a single unitary Metglas substrate, permits the formation of heads which are smaller and substantially closer to one another than in prior art head arrays. Consequently, the invention permits and facilitates the introduction of substantially higher-density formats for writing and retrieval of data on magnetic media. The second head grouping in head array 42 is designed to achieve a substantial increase in the storage capacity of magnetic media by greatly increasing the density of bit storage through use of narrower tracks on the media. For example, a 3½-inch ferric oxide ($Fe_3O_4$) disc, having a capacity of approximately 1.44 megabytes in the current format, can achieve, under the higher density format described below, a storage capacity of perhaps 20-megabytes.

The second grouping of read-write heads in array 42 is indicated on FIG. 5 at 108. Second head grouping 108 is a high-density head grouping and includes heads 76, 78, 80 and 82. Head 76 is a servo head and includes a first pole component 110, a second pole component 112 and gap 114 therebetween. Servo head 76 is included in high-density array grouping 108 to facilitate tracking the high-density heads relative to a disc. It is offset from the other heads in high-density array grouping 108 (heads 78, 80 and 82 being collinear along a single track) and functions by laying down servo bursts on the magnetic media and then tracking the bursts to properly orient heads 78, 80 and 82 along selected high-density tracks on the media.

Heads 78, 80 and 82 of high-density array 108 are, respectively, the erase, write and read heads for high-density array grouping 108. Head 78 includes a first pole component 116, a second pole component 118 and gap 120 therebetween. Head 80 includes a first pole component 122, second pole component 124 and gap 126 therebetween. Head 82 includes a first pole component 128, a second pole component 130 and gap 132 therebetween. Heads 78, 80 and 82 are depicted in FIG. 5 as approximately co-linear with one another along the curved line of a data track on a 3½-inch magnetic media disk. As with the other heads, the media in FIG. 5 would be moving past the heads in the direction of arrow 60.

In operation, high-density head array 108, which forms the second head grouping in read-write head array 42, employs servo head 76 to position an arm or other moveable support for the head array along a selected track of the magnetic media. As described above, servo head 76 lays down a servo burst during the disc formatting process and then follow the selected servo burst associated with each track on the disc to be accessed. Positioning of the high-density heads 78, 80 and 82 is accomplished by physical movement of the head array on its support arm, in a manner well known to those skilled in the art. Once properly positioned, the high-density head array will be used to write and retrieve data laid down by the heads.

Head 78 functions as a pre-erase head and is energized and employed whenever magnetic images are to be laid down on the media to remove latent magnetic polarizations and any extraneous noise. Head 80, which is the write head, will lay down magnetic images on the media and head 82, which is the read head, will retrieve images from the media. To provide proper tracking between the read and write heads 80 and 82, respectively, read head 82 has a gap 132 which is preferably no greater than approximately 95% as wide as that of write head gap 126. As such, read head 82 reads a narrower band than that laid down by write head 80, permitting full data retrieval, even without exact track alignment. The high-density head array of the present invention thus, when used with servo-positioning, eliminates the need for a pair of "trim" erase heads, as are used in current formats. In the preferred embodiment the gap width 126 on write head 80 is 24-microns, the gap width 120 on erase head 78 is 24-microns and the gap width 132 on read head 82 is 21-microns.

The shape of each of the gaps in the heads of head array 42 significantly affects the performance of the head. Different gap sizes are used in the different heads of the array in order to optimize performance of each head. For example, write-only heads preferably have a gap length of approximately 50-microinches at the point of greatest separation between opposed first and second pole components and read-only heads preferably have a narrower gap of approximately 20- to 25-microinches between pole components. In the head array 42 of the preferred embodiment, the following gap sizes have been found effective, although it should be understood that head gap sizes are a matter of design choice, depending on media type, bit density desired, relative speed of the media and numerous other factors. Consequently, the following gap dimensions, measured at the point of greatest separation between the first and second pole components on each head, are suggestive only and other head gap sizes are possible within the scope of the present invention:

| Erase heads 70 and 72 | gap width 68 microns |
| | gap length 50 microinches |
| Read/write head 74 | gap width 164 microns |
| | gap length 50 microinches |
| Servo head 76 | gap width 36 microns |
| | gap length 25 microinches |
| Erase head 78 | gap width 24 microns |
| | gap length 50 microinches |
| Write head 80 | gap width 24 microns |
| | gap length 50 microinches |
| Read head 82 | gap width 21 microns |
| | gap length 25 microinches |

The second head grouping including heads 76, 78, 80 and 82 lays down significantly narrower data tracks on magnetic media than the heads of first head grouping 70, 72 and 74. A single data track laid down on ferric oxide ($Fe_3O_4$) flexible media such as a floppy disc using the existing format of heads 70, 72 and 74 is approximately 8-mils in width. A data track laid down by the high-density second grouping of heads 76, 78, 80 and 82 is approximately 24-microns or 1-mil in width. Narrower data tracks contribute to the higher density storage obtainable using the high-density format of the present invention.

It has been found that a selected head gap configuration which employs a tapered gap, longer in the center and tapering to a narrower gap at the edges, reduces "side writing." Side writing is magnetic flux extending beyond the side edges of a magnetic gap, which distorts or affects magnetic images on adjacent tracks in multi-track magnetic media. Side writing is normally dealt with either by allowing sufficient space between data tracks on magnetic media so that adjacent tracks do not interfere with one another or by use of "trim" erase heads which narrow the track laid down, as described above.

Figure 6:
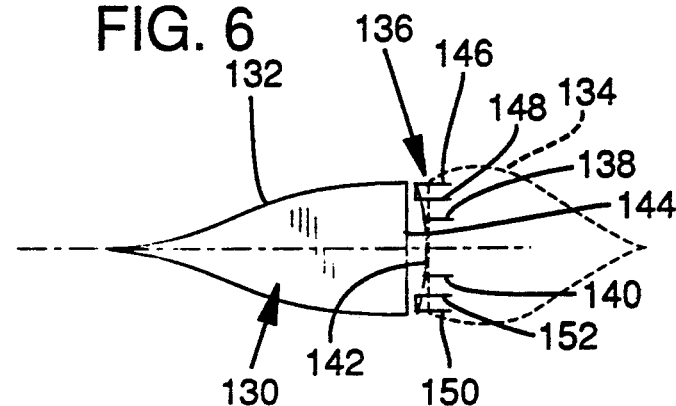
FIG. 6 is a view, further enlarged from FIG. 5, showing an illustrative head with an anti-side-writing gap.

Referring to FIG. 6, I have developed a system, claimed in another patent application, for creating a contoured gap which virtually eliminates the side writing phenomenon. The head structure depicted in FIG. 6 is equivalent to the head structures shown in FIGS. 1 and 2 and described in connection with the other heads of electromagnetic head array 42. In order to describe the anti-side-writing gap architecture I have developed, the description of the head shown in FIG. 6 will be directed to a generic head 130, having a structure which can be incorporated into any of the above-described heads when anti-side-writing is desired. Head 130 includes the structural elements shown and described in connection with FIGS. 1 and 2. Triangular portion 132 represents the first pole component of the head, equivalent to "island" 16, and second pole component 134 is equivalent to permalloy component 24, with gap 136 therebetween. Gap 136 includes the edge tapering feature which eliminates the side writing phenomenon. Essentially, the head gap 136 is longer at the center and tapers to a shorter gap at each end of the gap.

Assuming, for example, that head 130 is a write head with a gap length of approximately 50-microinches, gap 136 will have the following shape. In the center of gap 136, extending over approximately 90% of the central width of the gap, between markings 138 and 140, gap 136 Will be 50-microinches wide. On the outer edges of gap 136, Outermost of markers 138 and 140, gap 136 will taper to a narrower spacing. One means of accomplishing the tapering is to angle the gap edge 142 of permalloy second pole component 134 to bring it closer to gap edge 144 of "island" first pole component 132. At the outermost limits of gap 136, between marks 146 and 148 on one side and marks 150 and 152 on the other side, the gap will preferably be narrowed down to approximately 10-microinches. Intermediate of the longer gap portion between marks 138 and 140 and the outermost short gap portions, the gap will gradually taper.

For a read head, which generally will have a shorter gap than a write head, the anti-side-writing gap structure will preferably be approximately 20-to 25-microinches long in the central area, between marks 138 and 140 on head 130. At the outermost narrow gap portions, the gap will be approximately 5-to 8-microinches long, with the gap tapering therebetween.

Because the high-density array (second head group 108) is intended to read and write data on narrow tracks in close proximity to one another, the anti-side-writing feature described in connection with FIG. 6 will be useful with the head array of the present invention. Any or all of the read, write and read/write heads of the present invention can employ the anti-side-writing feature depicted and described in connection with FIG. 6.

The present invention provides one or more magnetic media read-write head arrays on a single, unitary amorphous substrate. Head arrays formed according to the invention are extremely compact, in that they can be fabricated on a unitary piece of Metglas within the confines of a square not greater than ⅛-inch to ¼-inch on a side. The invention incorporates heads arranged to be compatible both with current magnetic media formats and with a new generation of high-density formats which greatly increase the storage capacity of the media. Because the heads are formed on a unitary substrate, head arrays are both economical to manufacture and provide close spacing between heads. Close head spacing results in efficiencies in both media usage and in magnetic media storage devices, which can store more data while employing smaller or less expensive servos and other moving parts.

The technique of producing read-write head arrays for magnetic media can also be employed in formats compatible with magnetic tape media. Alternative head configurations and media types are possible within the scope of the present invention.

The present invention provides an electromagnetic head array for storage and retrieval of magnetic and coded data which incorporates a plurality of head structures formed on a single unitary web of thin magnetic material. The invention provides electromagnetic head arrays which enable very high bit densities to be laid down on magnetic media, substantially increasing the storage capacity of magnetic media. Electromagnetic head arrays formed in accordance with the present invention include two different head groupings formed on a single thin unitary web of magnetic material, one of the head groupings being capability with current magnetic media data storage and retrieval formats and the other head grouping being adapted to higher density formats.

What is claimed is:

1. An electromagnetic head array for storage and retrieval of magnetic images of data on adjacent magnetic media moving relative to the head array, comprising:
    a unitary amorphous metallic substrate,
    a plurality of head structures integral with said substrate,
    each said head structure including a pair of juxtaposed magnetic pole components defining a gap for detecting and producing magnetic flux adjacent said gap,
    conductor means associated with each said head structure for selective production and retrieval of electromagnetic signals.

2. An electromagnetic head array as in claim 1 in which said unitary amorphous metallic substrate is Metglas.

3. An electromagnetic head array as in claim 1 in which said unitary amorphous metallic substrate, including each of said head structures integral therewith, is approximately 1.5-mils in thickness.

4. An electromagnetic head array as in claim 3 in which said plurality of head structures includes seven of said head structures integral with said substrate, wherein all seven head structures lie within said approximately 1.5-mil thickness of said unitary amorphous metallic substrate and within a surface area less than ¼-inch square.

5. An electromagnetic head array as in claim 1 in which said plurality of head structures include first and second head groupings within the array, said first head grouping including a read-write head and two trim erase heads and said second grouping including at least one erase head, one write head and one read head.

6. An electromagnetic head array as in claim 5 in which said second head grouping additionally includes a servo head for orienting the head array with respect to locating tracks on the magnetic media.

7. An electromagnetic head array as in claim 5 in which said pole components defining said gap on said read head in said second head grouping define a gap which is approximately ninety percent as wide as the gap defined by the pole components on said write head of said second head grouping.

8. An electromagnetic head array as in claim 7 in which said pole components defining said gaps on said erase, write and read heads in said second head grouping define a gap approximately 24-microns in width on said erase and write heads and define a gap approximately 21-microns in width on said read head.

9. An electromagnetic head array as in claim 5 in which said pole components defining said gap on said read-write head in said first head grouping define a gap approximately 164-microns in width.

10. An electromagnetic head array as in claim 5 in which the approximate capacity of data storage available on a 3½-inch ferric oxide ($Fe_3O_4$) flexible disk is 1.4-megabytes using said first head grouping and 20-megabytes using said second head grouping.

11. An electromagnetic head array as in claim 5 in which the approximate width of a single data track on ferric oxide ($Fe_3O_4$) flexible disks is 8-mils using said first head grouping and 24-microns using said second head grouping.

12. An electromagnetic head array as in claim 1 in which each of said gaps in said electromagnetic head array is oriented generally transverse to the direction of relative motion of the magnetic media when in use.

13. An electromagnetic head array as in claim 1 including conductor means associated with each head structure for selective production and retrieval of electromagnetic signals from the head structures whereby external connections to the head structures are effected.

* * * * *